United States Patent Office 3,597,280
Patented Aug. 3, 1971

3,597,280
MULTIPLE VENT PLUG ASSEMBLY
Roy Erving Hennen, Mequon, Wis., assignor to
Globe-Union Inc., Milwaukee, Wis.
Filed Aug. 29, 1968, Ser. No. 756,129
Int. Cl. H01m 1/06
U.S. Cl. 136—177
10 Claims

ABSTRACT OF THE DISCLOSURE

A multiple vent plug assembly for electrical storage batteries which includes a body composed of a base, preferably an integral, unitary structure, having peripheral walls and a cover with lateral partitions inside the body dividing it into a plurality of separate chambers. A plurality of hollow vent plugs, located on the bottom of the base and each provided with a vent opening into the battery cell, open into the chambers. Each chamber is provided with an outlet for venting to atmosphere through the base. The internal construction of the chamber and configuration of the vent outlet are such that the flow of gases passing upward through the vent plugs, through the chambers and out through the vent outlets is sufficiently obstructed to prevent the inadvertent discharge of the electrolyte to atmosphere and the leakage of liquid electrolyte through the outlets when the battery is partially tipped or completely inverted.

BACKGROUND OF THE INVENTION

Field of the invention

This invention relates to multiple vent plug assemblies for storage batteries.

Electrical storage batteries, such as lead-acid batteries used for automotive purposes, include a container having a plurality of individual compartments, each of which house a cell composed of plates, electrolyte and associated connecting means. The battery container cover has an opening or filling well for each cell which is used to introduce electrolyte to the cell compartment, to inspect the electrolyte level during battery use and to add electrolyte or water as required. These filling wells also permit access for test probes which may be used for measuring the cell voltage level.

Each filling well is provided with a cap or plug to prevent the loss of electrolyte. These plugs are provided with small vent holes or passageways for venting to atmosphere, gases which evolve during chemical reactions taking place in the cell. A certain amount of electrolyte normally escapes from the cell in the form of a mist or vapor entrained in the gases. A certain amount of electrolyte also normally escapes through the vent plugs as a result of splashing when the battery is subjected to rough use, such as in vehicles moving over rough terrain or in boats. Also, a certain amount of electrolyte normally will spill through the vent plugs as a result of the battery being tipped during transportation or storage of the battery itself or while the battery is installed, such as during the transportation of automobiles in an angular position on transit carriers.

During service of a battery, the vent plugs must be frequently removed for inspection of the electrolyte level. Some batteries utilize individual vent plugs which must be removed and replaced separately. The removal and replacement of each individual plug is very time consuming, especially for twelve volt batteries having six cells. The removed plugs are quite easily misplaced or dropped causing further delay or difficulty for an attendant servicing the battery.

DESCRIPTION OF THE PRIOR ART

To overcome the problems associated with individual vent plugs, and the inadvertent discharge of electrolyte, a multiple vent plug assembly containing a plurality of vent plugs in one unit has been proposed. U.S. Pats. 3,265,538 and 3,284,244 disclose multiple vent plug assemblies of this type. Such an assembly permits the simultaneous removal and installation of a plurality of vent plugs thereby alleviating problems associated with individual vent plugs.

There are several problems and disadvantages associated with the prior art multiple vent plug assemblies. For instance, the assembly disclosed by U.S. 3,265,538 is a three-piece structure requiring cementing which involves considerable assembly time and cost in addition to the expense of fabricating the component parts. The multiple vent plug described by U.S. 3,284,244 is a two-piece structure and does not require the cementing of parts; however, the friction force between the vent plugs and the filling walls of the battery cover is frequently sufficient enough to cause disengagement of the vent plugs from the main body during removal from the assembly of the battery. Generally, with the prior art multiple vent plug assemblies, an inversion or partial tipping of the battery during handling or transportation results in liquid electrolyte leaking out through the vent passageways. Also, condensate from the vaporous electrolyte venting to atmosphere tends to collect on the underside of the prior art multiple vent plug assemblies. This condensate can migrate to the top of the battery and result in an accumulation of corrosive acid thereon.

SUMMARY OF THE INVENTION

The primary object of this invention is to provide a simple and inexpensive multiple vent plug assembly for electrical storage batteries having improved venting means which minimize the loss of electrolyte during venting and during tipping or complete inversion of the battery. Another object of this invention is to provide such an assembly having simplified means for incorporating indicia thereon.

According to this invention, a multiple vent plug assembly is provided which includes a hollow body composed of a base, having peripheral walls, and a cover connected to the walls. A plurality of hollow vent plugs, which depend from the bottom of the base, open into separate chambers defined by lateral partitions depending upwardly from the base and connecting to the walls. Means are provided for permitting the egress of gases from the battery cells to atmosphere upward through the vent plugs into the chambers and from the chambers to atmosphere through the base, while sufficiently obstructing the passage of the egressing gases so that the inadvertent discharge of electrolyte from the cells is minimized. The chambers and venting means are configured so that a substantial quantity of liquid electrolyte can accumulate in the chambers before overflowing through the venting means to atmosphere. An air lock provided by the chamber and venting means permits the battery to be partially tipped or completely inverted without substantial loss of liquid electrolyte through the venting means. Battery identifying markings can be incorporated onto the separate cover thereby providing an inexpensive technique for making a variety of vent cap assemblies with the desired indicia.

In a preferred embodiment, the venting means consist of vertical vent stacks which are provided as an integral part of some of the partitions. These vent stacks have openings at the top adjacent to the cover which communicates with two chambers. In another embodiment, circular skirts, which are coaxial extensions of the vent plugs inside the body, act as baffles. These skirts are provided with vertical slotted openings through which the egressing gases pass to maximize the separation of electrolyte from the gases.

DESCRIPTION OF THE PREFERRED EMBODIMENTS

Figure 1:
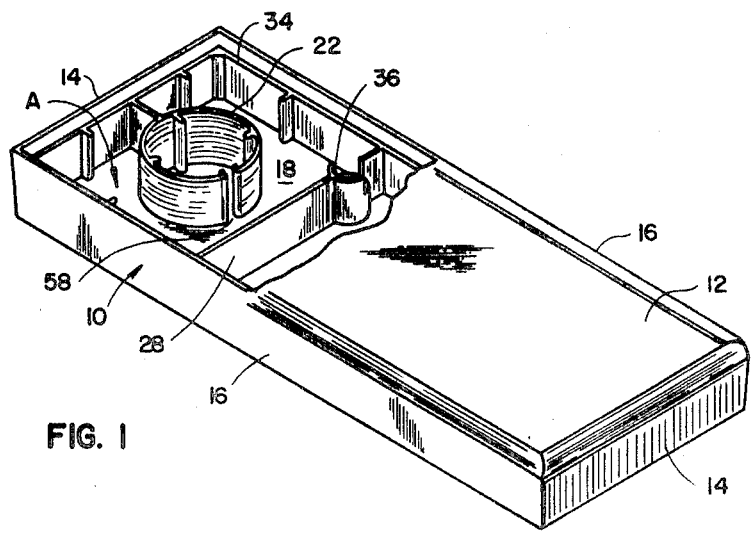
FIG. 1 is a perspective, top view of an assembled multiple vent plug assembly embodied by this invention with a portion of the top cut away to show the internal construction.
Figure 2:
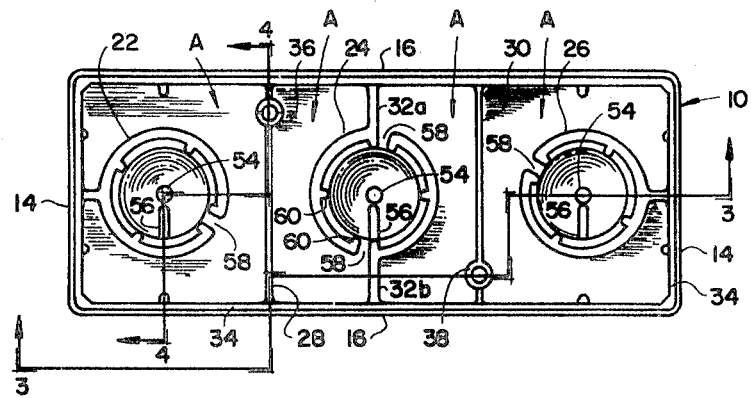
FIG. 2 is a plan view of the multiple vent plug assembly with the cover removed.
Figure 3:
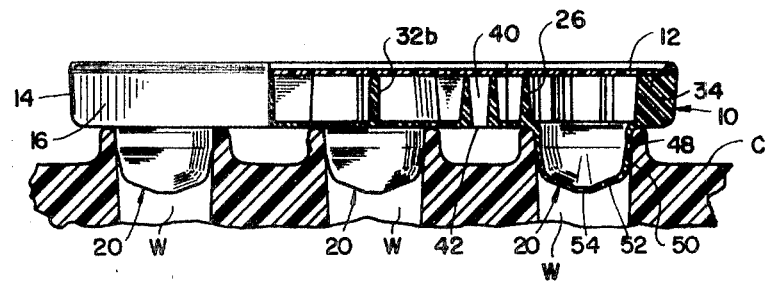
FIG. 3 is an elevation view, partially cross-sectioned along the planes designated 3—3 of FIG. 2, showing the multiple vent plug assembly installed in position in the filling wells of a battery.

Referring to FIGS. 1–4, an exemplary embodiment of the multiple vent plug assembly of this invention is illustrated. The multiple vent plug assembly includes an elongated base 10, preferably an integral, unitary structure, and an insert or cover 12. Base 10 is provided with upwardly depending end walls 14 and side walls 16 and bottom 18. Depending downwardly from the underside of bottom 18 are a plurality of hollow vent plugs, designated generally as 20. Depending upwardly from the top side of bottom 18 are a plurality of circular skirts 22, 24 and 26 which are coaxial extensions of vent plugs 20. As shown in FIGS. 2 and 3 the bottom 18 of base 10 is provided with openings so that the internal volumes defined by each of the circular skirts and vent plugs are in communication.

Lateral partitions 28 and 30 depend upwardly from the top side of bottom 18 and extend between side walls 16. Lateral partitions 32a, 32b depend upwardly from top side of bottom 18 and extend between diametrically opposed sides of skirt 24 and side walls 16. End walls 14 and side walls 16 are provided with a peripheral flange 34 upon which cover 12 rests when assembly is complete. Skirts 22, 24 and 26, partitions 28, 30, 32a, 32b and flange 34 are configured and arranged so that cover 12 engages the top surfaces thereof when installed and separate chambers, generally designated by an A in FIG. 2, are defined.

Figure 4:
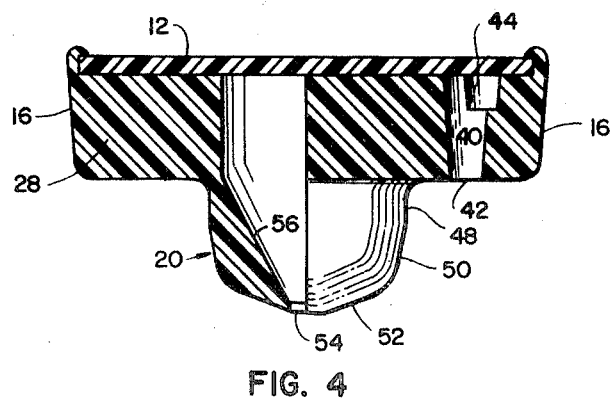
FIG. 4 is an enlarged cross-sectional view along the planes designated 4—4 of FIG. 3.

In FIGS. 1–4 a preferred embodiment is illustrated wherein partitions 28 and 30 are provided with integral vent stacks, 36 and 38, respectively. Each of the vent stacks 36 and 38 have a passageway 40 which is open to the atmosphere through opening 42 in base 10 as best illustrated in FIGS. 2 and 4. Vent stacks 36 and 38 include a notch 44, which in conjunction with passageway 40, provides a vent path from chambers A to atmosphere. With this arrangement, the assembly acts as a pressure manifold which reduces the rapid venting of gases from any one cell while preventing an excess pressure build-up. If this feature is not desired, each chamber can be provided with its own vent stacks or vent stacks can be provided in the center chambers (as viewed in FIG. 2) with openings provided in partitions 28 and 30 to allow the gases to vent from the two end chambers (as viewed in FIG. 2) out through the vent stacks.

As shown in FIGS. 3 and 4, each vent plug 20 has a cup-like body. The upper portion 48 of the plug 20 is dimensioned to fit snugly into a filling well of a battery, in which the assembly is installed, to produce a tight seal. FIG. 3 shows the multiple vent plug assembly installed with the vent plugs 20 in position in the filling wells of a battery. The letter C designates the cover of a battery which is provided with a plurality of circular filling wells W. The lower portion 50 of plug 20 is tapered slightly inward so that the vent plugs 20 can be easily aligned with the filling wells W during the installation of the assembly. The bottom portion 52 of the vent plug 20 tapers slightly toward its center and is provided with a small vent port 54 which permits entrance of gas from a battery cell into the plug for subsequent discharge to atmosphere as described hereinafter.

As shown in FIG. 4, each vent plug 20 is provided with an internal gusset 56, the function of which is to break up any vortexing action of gas or liquid inside the vent plug. Rapid entry of gases through vent opening 54 and/or battery vibration can induce undesirable vortexing of the fluids which promotes discharge of entrained electrolyte to the atmosphere along with venting gases.

As shown in FIGS. 1 and 2, skirts 22, 24 and 26 are provided with slots 58 which permit the passage of gas from inside the vent plugs into chambers A. Slots 58 are preferably positioned so that the path of gases venting to atmosphere through vent stacks 36 and 38 is somewhat tortuous, as illustrated in FIG. 2, rather than being a straight-line. The opening provided by slots 58 is relatively small in order to produce a venturi effect as gas passes therethrough so that at least a portion of any entrained or vaporized electrolyte is separated from the gas and drops back inside the vent plug 20. Vertical ribs inside the skirts, two of which are designated as 60 on skirt 24 in FIG. 2, also aid in breaking up the vortexing action of the fluids.

Figure 5:
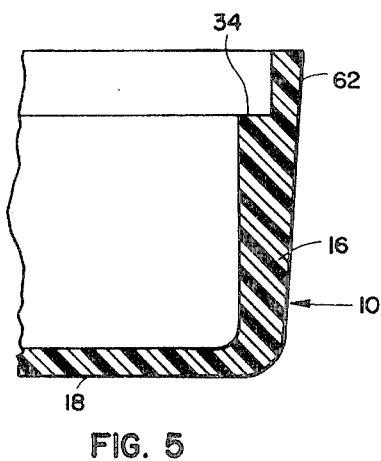
FIG. 5 is an enlarged fragmentary cross-sectional view of the body of the multiple vent plug assembly without the cover installed.
Figure 6:
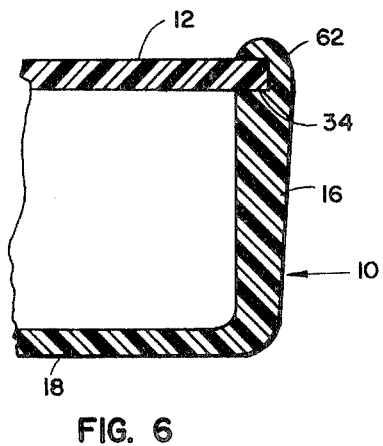
FIG. 6 is an enlarged fragmentary cross-sectional view of the body of the multiple vent plug assembly with the cover installed in accordance with one embodiment.

FIGS. 5 and 6 illustrate an exemplary embodiment for assembling cover 12 to base 10. As shown in FIG. 5, wall 16 (which represents either the end or side wall designated as 14 and 16 in FIGS. 1–4) is provided with a flange 34. Cover 12 is positioned onto flange 34 and wall extension 62 is swaged over by any conventional technique, such as by the simultaneous application of heat or ultrasonic vibration and mechanical force to tightly engage cover 12 around its periphery. Any other conventional methods for obtaining a leak-tight bond between cover 12 and base 10, such as by cementing, using a press fit and the like, can be used.

When the multiple vent plug assembly is installed in a battery with each plug located in a filling well, each filling well is closed to discharge of electrolyte. However, gases created by chemical reactions in the battery cells can be discharged so as to prevent an undesirable pressure buildup. Such gases can enter the hollow vent plug 20 through vent opening 54, pass upward through skirt slots 58 into chambers A, and then exit from chambers A and pass downward through vent stacks 36 and 38 to atmosphere. The general configuration of the hollow vent plugs and circular skirts offers substantial obstruction to the upward passage of any liquid electrolyte which finds its way into the plug body. The provision of chambers A, which act as liquid reservoirs, and vent stacks 36 and 38, which can act as standpipes, permit some quantity of liquid electrolyte to accumulate in the multiple vent plug assembly before discharging to atmosphere, thereby further preventing the undesired discharge of electrolyte to atmosphere. The change of direction in the flow of venting gases necessitated by the arrangement of slots 58 and vent stacks 36 and 38 substantially eliminates the possibility of entrained electrolyte being exhausted to atmosphere. Since the bottom portion 52 of the vent plugs 20 is tapered toward vent opening 54, any electrolyte which finds its way into the plug will eventually flow back into the cell through the opening 54. Slots 58 are configured so that any electrolyte which might accumulate in chambers A will also flow from chambers A back into the cell through vent opening 54.

Tests have been performed on several batteries using multiple vent plug assemblies constructed in accordance with this invention where the batteries were tipped at varying angles, including the fully inverted position, to evaluate the amount of electrolyte leakage through the vent stacks. In the absence of physical damage to the frictional sealing surfaces of outer surface of vent plugs and inner surface of filling wells it was found that batteries equipped with multiple vent plug assemblies embodied by this invention could remain tipped, including full inversion, for time periods of well over an hour with minimal or, in the majority of instances, no electrolyte leakage. Electrolyte flowing from the cell fills chambers A and vent stacks 36 and 38 preventing the entrance of air to the cells through the venting passageways 40 creating an air lock which inhibits further electrolyte flow. It must be pointed out that this feature is effective only as long as the pressure inside the battery is approximately equal to atmospheric pressure.

Another feature of the multiple vent plug assembly of this invention is that the air lock provided by chambers A and vent stacks 36, 38 permits a battery to be submerged for a reasonable period of time without any substantial entry of liquid through the vent stacks. This feature is advantageous for marine applications, especially where batteries are used in a salt water environment. Chlorine is released when salt water mixes with battery acid thereby creating a hazardous condition in a confined area. This invention substantially alleviates safety problems associated with submersion of batteries in salt water, in addition to minimizing the dilution or contamination of the electrolyte when the battery is submerged in any liquid. Of course, the operability of this feature is limited to the depth of submersion, i.e., at greater depths the water pressure will be high enough to create a pressure differential high enough to result in entrance of water into the battery.

The base of the multiple plug assembly can be fabricated from any material which is chemically inert to the battery acid and has sufficient resiliency so that the vent plugs can be slightly deformed during installation to compensate for manufacturing tolerances of the location and configuration of the filling wells. Thermoplastic, polymeric materials, such as olefin polymers, particularly polypropylene, polyethylene, copolymers of propylene and ethylene, and acrylonitrile-butadiene-styrene (ABS), are preferred since they can be readily molded by conventional techniques, such as injection molding, at high production rates. Various pigments can be admixed with plastic material prior to molding to obtain the desired colors.

The cover can be fabricated from any material which is inert to the battery acid and has a structural integrity capable of the handling that the multiple vent plug assembly will be subjected to during the life of the battery. For example, the cover can be fabricated from a variety of plastic materials, including the same material as the base, and some other materials such as plastic-encapsulated metals to produce a metallized appearance. The use of a separate cover, as provided by this invention, affords the capability of producing a variety of multiple vent plug assemblies having tops with vastly different appearances, colors, and indicia by simply installing a desired cover which can be inexpensively fabricated because of its simplicity of design. The indicia, such as trade name or artistic design, can be molded on the top of the cover in the form of embossment or engraving during fabrication or can be added by paint or decal after fabrication. The top of the cover can be substantially flat, as shown in the drawings, or can be any of a variety of shapes to enhance the customer appeal.

Any number of vent plugs can be combined in a single multiple vent plug assembly. Preferably, as shown in FIGS. 2 and 3, for an ordinary twelve volt battery containing six cells, two such assemblies having three vent plugs are used so that an attendant servicing a battery is required to make only two plug removals in order to service all six cells.

As it is apparent to those skilled in the art, various alterations and modifications can be made to this invention in retrospect thereof.

What is claimed is:

1. A multiple vent plug assembly for electrical storage battery filling wells comprising a hollow body composed of a base having peripheral walls and a cover connected to said walls; a plurality of lateral partition means depending from said base and connected to said walls, internal to said body, arranged to divide said body into a plurality of chambers; a plurality of hollow vent plugs depending from the bottom of said base, at least one of said vent plugs opening into each of said chambers; and means for venting each of said chambers through said base to atmosphere, said venting means being arranged so as to permit the egress of gases from the battery cells to atmosphere while offering obstruction to the discharge of electrolyte from the cells and to permit the accumulation of liquid in said chambers.

2. The multiple vent plug assembly of claim 1 wherein said venting means comprises vertical vent stacks internal of said body depending upwardly from said base communicating between said chambers and atmosphere.

3. The multiple vent plug assembly of claim 2 wherein said walls are provided with an inner peripheral flange and said cover is held in position on said flange by a swaged over portion of said walls.

4. The multiple vent plug assembly of claim 2 wherein said base is provided with a plurality of upwardly depending circular skirts, said skirts being in coaxial relationship with said vent plugs.

5. The multiple vent plug assembly of claim 4 wherein said vent stacks are an integral part of at least a portion of said partition means and have an inlet located adjacent said cover in communication with two of said chambers.

6. The multiple vent plug assembly of claim 5 wherein said skirts are provided with a slotted opening for the passage of egressing gases.

7. The multiple vent plug assembly of claim 6 wherein said walls are provided with an inner peripheral flange and said cover is held in position on said flange by a swaged over portion of said walls.

8. The multiple vent plug assembly of claim 7 wherein said body is fabricated from a thermoplastic, polymeric material.

9. The multiple vent plug assembly of claim 8 wherein at least two of said partition means are without vent stacks and are connected at one end to diametrically opposed sides of at least one of said skirts.

10. The multiple vent plug assembly of claim 8 wherein said vent plugs include an internal gusset for breaking up vortexing action of any fluids inside of said vent plugs.

References Cited

UNITED STATES PATENTS

| 3,265,538 | 8/1966 | Lucas | 136—177 |
| 3,284,244 | 11/1966 | Lucas | 136—177 |
| 3,369,940 | 2/1968 | Slautterback | 136—177 |

FOREIGN PATENTS

| 185,859 | 9/1955 | Austria | 136—177M |

WINSTON A. DOUGLAS, Primary Examiner

D. L. WALTON, Assistant Examiner